United States Patent [19]

Sakurada

[11] 4,441,370
[45] Apr. 10, 1984

[54] VIBRATION SENSOR

[75] Inventor: Okinobu Sakurada, Yokohama, Japan

[73] Assignees: Matsushita Electric Industrial Co., Ltd., Osaka; Toyota Jidosha-Kogyo Kabushiki Kaisha, Aichi, both of Japan

[21] Appl. No.: 344,226

[22] Filed: Jan. 29, 1982

[30] Foreign Application Priority Data

Jan. 30, 1981 [JP] Japan .................. 56-12947[U]

[51] Int. Cl.³ .................. G01L 23/22; G01H 1/08
[52] U.S. Cl. .................. 73/651; 73/35; 310/354
[58] Field of Search .................. 73/35, 651, 654; 310/329, 330, 354

[56] References Cited

U.S. PATENT DOCUMENTS

| | | | |
|---|---|---|---|
| 2,203,332 | 6/1940 | Kinsley | 310/354 |
| 3,113,223 | 12/1963 | Smith et al. | 310/329 |
| 3,698,245 | 10/1972 | McNabb | 73/651 |

*Primary Examiner*—James J. Gill
*Attorney, Agent, or Firm*—Birch, Stewart, Kolasch & Birch

[57] ABSTRACT

A vibration sensor comprises a support plate, a generally elongated vibrator element mounted on the support plate at one end thereof in a cantilever fashion, and at least one plate-like metallic piece rigidly secured to that one end of the vibrator element.

7 Claims, 6 Drawing Figures

Fig. 1 Prior Art
Fig. 2 Prior Art
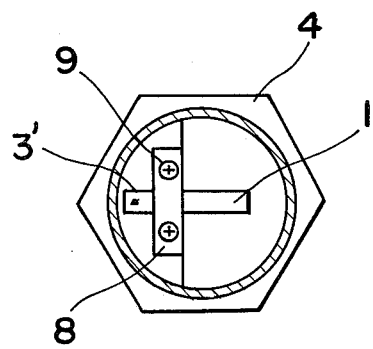
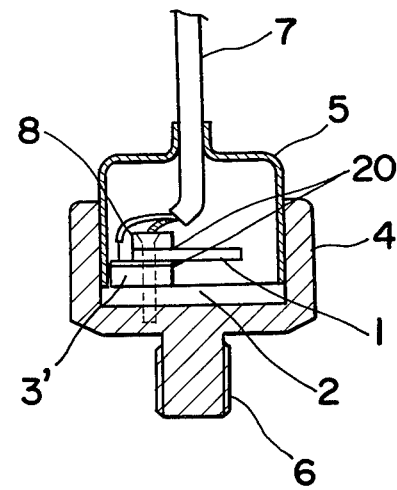
Fig. 3
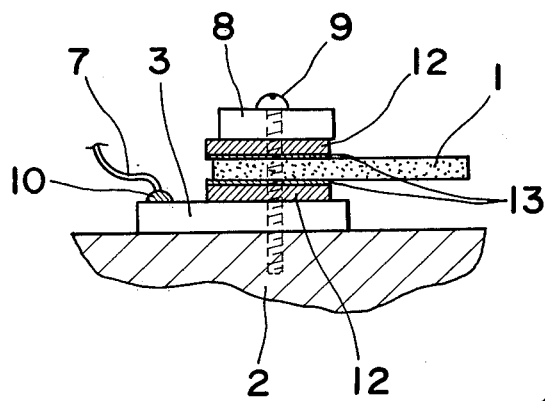
Fig. 4
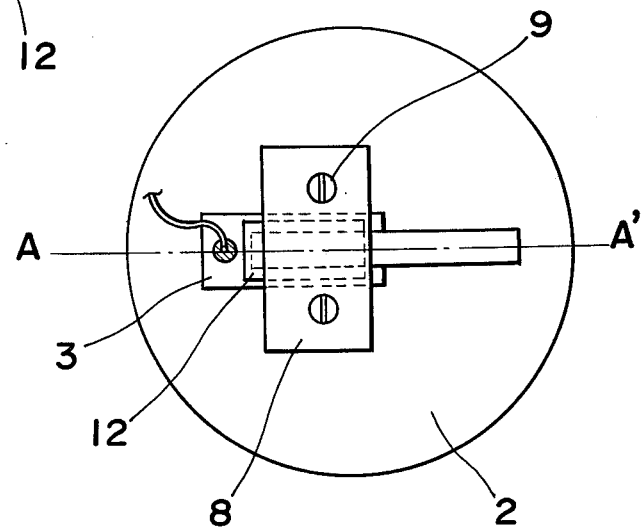

VIBRATION SENSOR

BACKGROUND OF THE INVENTION

The present invention relates to a vibration sensor useful as a knocking sensor for detecting the occurrence of an engine knocking.

A typical conventional vibration sensor, shown in FIGS. 1 and 2 in transverse and side sectional views, respectively, comprises a casing assembly, constituted by a casing mount 4 having a threaded stud 6 formed integrally therewith and a cap member 5 mounted on the casing mount 4 to define a chamber therebetween, a ceramic vibrator 1 mounted inside the casing chamber on a base plate 2 through a support block 3', and a cable 7 electrically connected to electrodes 8 for the transmission of an electrical signal indicative of the occurrence of vibrations to an external electrical circuit. The vibration sensor is installed at a location, or a portion of an automobile engine, where vibrations are to be detected, with the threaded stud 6 firmly engaged thereto.

Since the frequency of vibrations detected by the vibration sensor is determined depending on the amount of projection, i.e., the effective length, of the vibrator 1 from the point of support to its free end extremity, this effective length must be exactly reproduced in each of vibration sensors when the latter are successively mass-produced. However, in the construction shown in FIGS. 1 and 2, the arrangement wherein the vibrator 1 is merely sandwiched between a retainer 8 and both of the base plate 2 and the support block 3' tends to pose a problem in that the effective length of the vibrator 1 may change when one or both of set screws 9 are loosened and/one or both of portions 20 of the vibrator 1 which are held in contact with the support block 3' and the retainer block 8, respectively, are deformed under the influence of the vibrations. In view of this, it is difficult to fix the frequency of vibrations to be detected at a constant value during the manufacture and, also, the use of the vibration sensor.

SUMMARY OF THE INVENTION

The present invention has been developed with a view to substantially eliminating the disadvantages and inconveniences inherent in the prior art vibration sensor and has for its essential object to provide an improved vibration sensor wherein the frequency of vibrations to be detected thereby can easily be fixed during the manufacture thereof.

Another important object of the present invention is to provide an improved vibration sensor of the type referred to above, which has an operating characteristic which does not change with the aging.

According to the present invention, the above described objects can be accomplished by securing a plate-like metallic piece to the vibrator by the use of any suitable bonding agent prior to the mounting of the vibrator, the assembly of the vibrator and the metallic piece being subsequently retained in position.

BRIEF DESCRIPTION OF THE DRAWINGS

These and other objects and features of the present invention will become apparent from the following description taken in conjunction with preferred embodiments thereof with reference to the accompanying drawings, in which:

FIG. 1 is a transverse sectional view of the prior art vibration sensor;

FIG. 2 is a side sectional view of the prior art vibration sensor shown in FIG. 1;

FIG. 3 is a side sectional view of an essential portion of a vibration sensor according to a preferred embodiment of the present invention;

FIG. 4 is a top plan view of the sensor shown in FIG. 3; and

DETAILED DESCRIPTION OF THE INVENTION

Figure 5:
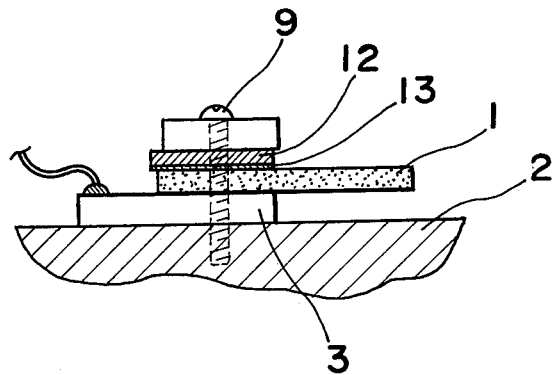
FIGS. 5 and 6 are views similar to FIG. 3, showing other preferred embodiments of the present invention, respectively.

Before the description of the present invention proceeds, it is to be noted that like parts are designated by like reference numerals throughout the accompanying drawings.

Referring first to FIGS. 2 and 3, reference numeral 3 represents a seat member on which the vibrator 1 is mounted. This seat member 3 also serves as an electrode to which the cable 7 is connected in any suitable manner. As best shown in FIG. 3, in accordance with the teachings of the present invention, one end portion of the vibrator 1 has plate-like metallic pieces 12 rigidly secured to the opposite surfaces thereof by means of soldering or by the use of a bonding agent. Reference numeral 13 represents a deposit of a solder or a bonding agent which has been used to secure each of the plate-like metallic pieces 12 to the respective surface of the vibrator 1. The assembly of the vibrator 1 and the plate-like metallic pieces 12 secured thereto is mounted on the seat member 3 and sandwiched between the seat member 3 and the retainer 8 with the set screws 9 passed therethrough and tapped into the casing mount 2 as best shown in FIG. 2.

Figure 6:
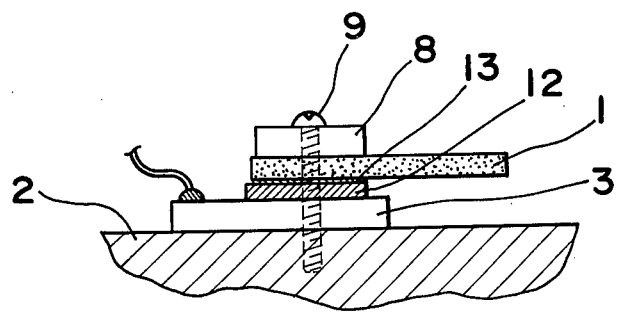

Although the two plate-like metallic pieces 12 have been used in the sensor according to the embodiment shown in FIGS. 3 and 4, only one plate-like metallic piece may be sufficient. By way of example, in the embodiment shown in FIG. 5, the plate-like metallic piece 12 is rigidly secured to only one of the opposite surfaces of the vibrator 1 which is remote from the seat member 3. On the other hand, in the embodiment shown in FIG. 6, the plate-like metallic piece 12 is rigidly secured to only one of the opposite surfaces of the vibrator 1 which faces the seat member 3.

Even in the vibration sensor according to any one of the foregoing embodiments of the present invention, the frequency of vibrations to be detected thereby is determined, as is the case with the prior art vibration sensor, depending on the amount of projection, i.e., the effective length, of the vibrator 1 beyond the plate-like metallic piece or pieces 12. However, in view of the fact that the vibrator 1 is firmly supported by the plate-like metallic piece or pieces 12 secured thereto by the bonding agent 13, no change occurs in the effective length of the vibrator 1 in the vibration sensor according to the present invention even when it is subjected to vibrations. In addition, since the plate-like metallic piece or pieces 12 are secured to the vibrator prior to the mounting of the vibrator, the effective length of the vibrator 1 can readily be determined for all of the vibration sensors during the manufacture thereof and, therefore, by the utilization of the teachings of the present invention, the vibration sensors of uniform quality and performance can be manufactured. Therefore, the vibration sensor according to the present invention is substantially free from such disadvantages that the effective length of the vibrator may change as a result of the loosening of one or both of the set screws and that the frequency of vibrations to be detected thereby may change with time.

Although the present invention has fully been described in connection with the preferred embodiments thereof, it is to be noted that various changes and modifications are apparent to those skilled in the art. By way of example, where the metallic piece 12 is provided between the vibrator 1 and the seat member 3 as shown in any one of FIGS. 3 and 6, the cable 7 may be connected directly to the metallic piece 12 instead of the seat member 3. In such case, the member 12 sandwiched between the vibrator 1 and the seat member 3 may be made of an electrically insulating material with no electroconductive layer required on one surface of such member 12 facing the vibrator 1.

Accordingly, such changes and modifications are to be understood as included within the true scope of the present invention unless they depart therefrom.

I claim:

1. A vibration sensor which comprises a support plate, a generally elongated bivrator element mounted on and extending from the support plate in a cantilever fashion, and at least one plate-like metallic piece interposed between the vibrator element and the support plate and rigidly secured to that end portion of the vibrator where said vibrator is mounted on the support plate said plate-like metallic piece being secured to the vibrator element by soldering or a bonding agent.

2. The vibration sensor as claimed in claim 1, wherein said plate-like metallic piece is secured to one of the opposite surfaces of the vibrator element which is remote from the support plate.

3. The vibration sensor as claimed in claim 2, further comprising an additional plate-like metallic piece rigidly secured to the other of said opposite surfaces of the vibrator element.

4. The vibration sensor as claimed in claim 1, wherein said plate-like metallic piece is secured to one of the opposite surfaces of the vibrator element which faces the support plate.

5. The vibration sensor as claimed in claim 4, further comprising an additional plate-like metallic piece rigidly secured to the other of said opposite surfaces of the vibrator element.

6. The vibration sensor as claimed in claim 3 or 5, wherein said another metallic piece is secured to the vibrator element by means of a soldering.

7. The vibration sensor as claimed in claim 3 or 5, wherein said another metallic piece is secured to the vibrator element by means of a bonding agent.

* * * * *